United States Patent [19]
Sare et al.

[11] Patent Number: 6,103,005
[45] Date of Patent: Aug. 15, 2000

[54] COMPOSITIONS OF LARGE PARTICLE CALCINED KAOLIN CLAY AND METHODS OF MAKING THE SAME

[75] Inventors: Edward J. Sare, Macon; Stephen C. Raper, Byron; Tommy L. Adkins; Curtis L. Manning, both of Cochran, all of Ga.

[73] Assignee: Imerys Kaolin, Inc., Dry Branch, Ga.

[21] Appl. No.: 09/202,440

[22] PCT Filed: Jun. 20, 1997

[86] PCT No.: PCT/US97/10631

§ 371 Date: Sep. 10, 1999

§ 102(e) Date: Sep. 10, 1999

[87] PCT Pub. No.: WO97/48653

PCT Pub. Date: Dec. 24, 1997

[51] Int. Cl.$^7$ .............................. C04B 14/10; C04B 33/04
[52] U.S. Cl. ..................... 106/486; 106/416; 106/485; 241/16; 241/23; 501/150
[58] Field of Search .................................. 106/416, 486, 106/485; 241/16, 23; 501/150

[56] References Cited

U.S. PATENT DOCUMENTS

| 2,992,936 | 7/1961 | Rowland et al. | 106/288 |
|---|---|---|---|
| 3,586,523 | 6/1971 | Fanselow et al. | 106/288 B |
| 4,241,142 | 12/1980 | Kaliski et al. | 428/511 |
| 4,851,048 | 7/1989 | Jones et al. | 106/446 |
| 4,888,315 | 12/1989 | Bowman et al. | 501/144 |
| 5,454,865 | 10/1995 | Ginn et al. | 106/486 |
| 5,516,364 | 5/1996 | Brantley et al. | 106/484 |
| 5,522,924 | 6/1996 | Smith et al. | 106/488 |
| 5,645,635 | 7/1997 | Behl et al. | 106/416 |

FOREIGN PATENT DOCUMENTS

WO 91/17128  11/1991  WIPO ............................ C04B 33/04

*Primary Examiner*—Anthony Green
*Attorney, Agent, or Firm*—Finnegan, Henderson, Farabow, Garrett & Dunner, L.L.P.

[57] ABSTRACT

The present invention provides compositions, and method for making same, comprising large particle size, calcined kaolin clays that, when used in paint formulations, provide paints having low sheen and good weathering resistance. Compositions of the invention include a composition comprising the pigment produced by a process comprising calcining a feed comprising kaolin having a median equivalent spherical diameter (e.s.d.) as measured on a Sedigraph 5100 of greater than about 2.0 microns and having ≦ about 15% less than 0.5 micron.

55 Claims, No Drawings

COMPOSITIONS OF LARGE PARTICLE CALCINED KAOLIN CLAY AND METHODS OF MAKING THE SAME

BACKGROUND

1. Field of the Invention

The present invention is in the field of pigments particularly useful as flatting agents in low gloss or low sheen applications, such as low sheen paint formulations, and more particularly for weathering-resistant, low sheen paint formulations, and such as low gloss paper applications. The present invention provides pigments and methods for making them using large particle size clays.

2. Background

Kaolin clay pigments are obtained from kaolin crudes. The crudes can contain kaolin particles, oversize particle size impurities (grit), and fine and coarse particle size impurities, such as fine ferruginous or titaniferous impurities, which impart undesirable color to the clay. The kaolin particles typically occur in the crude over a wide range of particle sizes and shapes. Typically a kaolin crude, such as a typical Georgia crude will contain, after removing the grit, particles ranging in size from submicron or colloidal to 20 microns or larger. Typically the kaolin morphology includes arrangement in plates, which plates can be further arrayed in stacks. Particle size, impurity content and morphology can vary with location of the deposit and within any given deposit itself.

Particle size of kaolins are typically determined by sedimentation using Stokes law to convert settling rates to particle size distribution and assuming a spherical shape of the particles. Measurements of particle size determined by this method therefore are termed as e.s.d., i.e. equivalent spherical diameter, as determined by an instrument such as a Sedigraph 5100 (Micromeritics). Typically, kaolin particles finer than about 1 to 2 microns are composed of individual platelets, and particles larger than about 2 microns are composed of stacks or booklets of finer particles.

Calcined kaolins are typically produced by heating kaolins to temperatures generally above 800° C. to 1000° C. This calcination results in the dehydroxylation of the kaolin and transformation into an amorphous aluminum silicate. Typically, calcined kaolins are produced in naturally gas-fired kilns operating either horizontally or vertically. See, e.g., U.S. Pat. No. 3,586,523 (Fanselow et al).

Traditional flatting agents in the paint industry have included diatomaceous earths, coarse calcium carbonates, crystalline silica. Additionally, some calcined kaolins have been utilized as flatting agents, but with limited success, since the paints made with these calcined clays have tended to chalk or discolor during weathering. Traditional opacifying agents include titanium dioxide, which has a relatively high refractive index. Flatting agents are typically utilized in low sheen exterior and interior flat wall paints, and opacifying agents are typically utilized in most paints. In some matte paper applications, flatting agents have also found utility in producing coated paper of controlled lower gloss.

The present invention provides a composition comprising large particle size, calcined kaolin clays that, when used in paper applications, can provide quality low gloss papers, and, when used in paint formulations, provides paints having surprising characteristics: not only low sheen and good opacity, but also good weathering characteristics, i.e., low color change and low change in sheen associated with chalking over time upon exposure. Paints formulated with this inventive product demonstrate high resistance to UV and accelerated weathering, thus demonstrating superior exterior performance. Paints formulated using the present composition can be used both as exterior paints and as interior paints.

SUMMARY OF THE INVENTION

The present invention provides a composition comprising the pigment produced by a process comprising calcining a feed comprising kaolin having a median equivalent spherical diameter (e.s.d.) as measured on a Sedigraph 5100 of greater than about 2.0 microns and having ≦ about 15% less than 0.5 micron, thus producing the pigment.

Additionally, the present invention further provides a composition comprising a pigment comprising calcined kaolin having a median equivalent spherical diameter (e.s.d.) as measured on a Sedigraph 5100 of greater than about 2.0 microns and having ≦ about 15% less than 0.5 micron. Also provided is a weathering-resistant industrial coating or architectural coating composition comprising this composition.

The present invention provides a method of producing a pigment comprising fully calcining a feed comprising a kaolin having a median equivalent spherical diameter (e.s.d.) as measured on a Sedigraph 5100 of greater than about 2.0 microns and having ≦15% less than 0.5 micron, thus producing the pigment.

The present invention further provides a method of producing a pigment comprising partially calcining a feed comprising a kaolin having a median equivalent spherical diameter (e.s.d.) as measured on a Sedigraph 5100 of greater than about 2.0 microns and having ≦15% less than 0.5 micron, thus producing the pigment.

The present invention provides a method of producing a pigment comprising (a) delaminating a crude kaolin clay which can be fractionated to form two or more fractions, one fraction comprising a large particle size fraction, which large particle size fraction cannot be further effectively reduced in particle size by further delamination;

(b) calcining a dried feed obtained from the large particle size fraction from the delamination, the calcination product comprising the produced pigment.

Also provided by the present invention is a method of producing a pigment comprising (a) delaminating a crude kaolin fraction which delaminated crude fraction can be further fractionated to form two or more size fractions, one size fraction comprising a large particle size fraction, which large particle size fraction cannot be further effectively reduced in particle size by further delamination;

(b) calcining a dried feed obtained from the large particle size fraction from the delamination, the calcination product comprising the produced pigment.

DETAILED DESCRIPTION OF THE INVENTION

The present invention provides a composition comprising large particle size, calcined kaolin clays that, when used in paint formulations, provides paints having surprising characteristics: low sheen and good opacity. Additional compositions of the invention comprising large particle size, fully calcined kaolin clays have not only low sheen and good opacity, but also surprisingly good weathering characteristics, i.e., low color change and low change in sheen over time upon exposure to weather, e.g., UV light and water. Paints formulated with this inventive weathering-resistant product demonstrate high resistance to UV and accelerated aging, and demonstrate superior exterior performance. Paints formulated using the present composition can be used both as exterior paints and as interior paints. The present invention specifically provides a composition comprising a calcined kaolin having a median particle size distribution (median equivalents spherical diameter (e.s.d.) as measured on a Sedigraph 5100) of greater than about 2.0 microns, and also having less than or equal to only about 10 to 15% at 0.5 microns. All particle sizes set forth herein are as measured on a Sedigraph 5100. All pigments of this invention provide good flatting agents. Compositions comprising fully calcined kaolins, when used in paint formulations, provide paints having not only low sheen but also good weathering characteristics. Compositions comprising partially calcined kaolins, when used in paint formulations, provide paints having low sheen.

The present invention provides a composition comprising the pigment made by the process described herein. This process comprises calcining a large particle size feed and producing a final product of calcination having a median particle size (median equivalent spherical diameter (e.s.d.) as measured on a Sedigraph 5100) of greater than 2.0 microns, greater than 2.25 microns, more preferably greater than 2.5 microns, greater than 2.75 microns, greater than 3.0 microns, greater than 3.25 microns, or greater than 3.5 microns, and the calcination product also having less than or equal to about 10 to 15% less than 0.5 microns. The feed can be partially calcined or it can be fully calcined. Specifically, the present invention provides a composition comprising the pigment produced by a process comprising: fully calcining a feed comprising kaolin having a median equivalent spherical diameter (e.s.d.) as measured on a Sedigraph 5100 of greater than 2.0 microns and having less than or equal to about 15% less than 0.5 micron, thus producing the pigment. The present invention also provides a composition comprising the pigment produced by a process comprising: partially calcining a feed comprising kaolin having a median equivalent spherical diameter (e.s.d.) as measured on a Sedigraph 5100 of greater than 2.0 microns and having less than or equal to about 15% less than 0.5 micron, thus producing the pigment.

For any process or composition of this invention, the feed can have median particle size (e.s.d.) as measured on a Sedigraph 5100 of greater than 2.0 microns, greater than about 2.25 microns, more preferably greater than about 2.5 microns, greater than about 2.75 microns, greater than about 3.0 microns, greater than about 3.25 microns, or greater than about 3.5 microns, such as about 3.0 microns, about 3.5 microns, about 4.0 microns and about 4.5 microns, the feed also has less than or equal to about 15% less than 0.5 micron size particles, less than or equal to about 10%, less than or equal to about 8%, less than or equal to about 6%, e.g. 10%, 8%, 6% and as specifically seen in examples, 5.9%. The upper limit of the particle size of the feed can be determined simply by the natural limits in the deposit; alternatively, one can use standard methods to fractionate particles to isolate larger particle size fractions or any other method to isolate larger particle size fractions.

As used in the specification and in the claims, use of the singular can mean one or more, depending upon the context in which it is used.

Additionally contemplated is the product of a process comprising calcining a large particle size feed and producing a final product of calcination having a median particle size (median equivalents spherical diameter (e.s.d.) as measured on a Sedigraph 5100) of greater than 2.0 microns, greater than about 2.25 microns, more preferably greater than about 2.5 microns, greater than about 2.75 microns, greater than about 3.0 microns, greater than about 3.25 microns, or greater than about 3.5 microns, such as about 3.0 microns, about 3.5 microns, 4.0 microns and about 4.5 microns; the product also has less than or equal to about 15% less than 0.5 micron size particles, less than or equal to about 10%, less than or equal to about 8%, less than or equal to about 6%, e.g. 10%, 8%, 6% and as specifically seen in examples, 5.9%. The feed can be partially calcined or it can be fully calcined.

The feed can further comprise a weathering-inert diluent. By weathering-inert is meant a material that, when placed in a composition, is stable upon exposure to weather conditions, e.g., ultraviolet light and water. A paint film containing a weathering-inert diluent exhibits minimal change in color or overall gloss. Thus a weathering-inert material is UV-inert and it is weathering resistant. The weathering inert diluent can be added either before or after calcining, though typically, if the diluent can withstand calcining without adverse physical property effects, it is added to the feed for the calciner. Weathering-inert diluents are more advantageously included in compositions comprising fully calcined kaolins, since fully calcined kaolins provide paint compositions having good weathering resistance. The present invention provides a composition comprising the product of calcination described above and further comprising a weathering-inert diluent. The feed or calcined pigment composition can specifically further comprise one or more weathering-inert material selected from the group consisting of crystalline silica, amorphous silica, synthetic silicas and silicates including alumino-silicates, alumina, diatomaceous earths, wollastonite, mica, and nepheline syenite. Other suitable weathering-inert materials may be apparent to the skilled artisan, and can be readily determined by following the procedures set forth herein for determining weathering capabilities.

The feed for calcination can comprise an at least partially delaminated kaolin. Additionally, the feed or the final product can comprise at least about 50% kaolin, more preferably at least bout two-thirds, or about 67%, kaolin, also at least about 75% kaolin, at least about 80% kaolin, at least about 85% kaolin, at least about 90% kaolin, at least about 95% kaolin, or about 100% kaolin or 100% kaolin.

The feed preferably has low levels of natural impurities such as titania-containing impurities. Thus, it is preferred that the element titanium as found as impurities in the kaolin be present at low levels. By low levels of the element titanium is meant that the element titanium is present in the kaolin at levels of less than about 1%, less than about 0.75%, or most preferably less than about 0.6% when reported as the oxide, $TiO_2$. In particular, the feed can preferably have low levels of UV active impurities such as anatase. Thus, in a specific embodiment the level of anatase present in the kaolin is low, i.e., less than about 1%, less than about 0.75%, or most preferably less than about 0.6%.

The feed is preferably mostly plate-like. By mostly plate-like is meant that the feed is more plate than stack, though preferably the ratio of plate to stack is high. Thus, preferably the kaolin has a high aspect ratio. "High aspect ratio" is a term known in the art based upon the relative width and thickness of the plates in the kaolin. A preferred ratio is greater than or equal to about a 5 to 1 ratio. Thus, the ratio can be, for example, greater than or equal to about an 8:1, a 10:1, or a 15:1 ratio.

Typically, kaolin that can be used in the present invention is the large size fraction remaining after delamination of a typical crude kaolin, which fraction cannot be effectively delaminated into finer particles. In one example, Hydrite® Flat D (Dry Branch Kaolin Company, Dry Branch, Ga.), which has a relatively low aspect ratio, can be delaminated to produce large plates having a relatively high aspect ratio, which can be used in the present invention. The feed can also be a blend of plates and stacks; this blend can be varied, particularly as it affects opacity. For example, the aforementioned large plates with high aspect ratio produced from Hydrite® Flat D can be blended with Hydrite® Flat D as feed in the present invention.

As described above, the feed can also be a blend of other materials with kaolin fitting the above description for kaolin feed; however, the feed is preferably greater than about 50% kaolin, more preferably greater than about 60% kaolin, more preferably greater than about 70% kaolin, more preferably greater than about 80% kaolin, more preferably greater than about 90% kaolin and more preferably greater than about 95% kaolin. The percentage of kaolin can be adjusted accordingly, in particular to achieve the balance between the relative opacity and the relative flatting efficiency desired in the end product. The other materials blended with the kaolin are preferably weathering-inert materials and can be, for example, crystalline silica, amorphous silica, synthetic silicas and silicates including alumino-silicates, alumina, diatomaceous earths, wollastonite, mica, nepheline syenite etc., particularly material that may be present naturally in this kaolin size fraction. Preferably, the blend is calcined; however, alternatively, the kaolin can be calcined prior to blending it with the other materials. Additionally, however, the kaolin need not have other materials blended with it. A preferred embodiment can be a composition having virtually no crystalline silica.

In certain embodiments of the present invention, the feed is calcined fully, i.e., to the point where the residual hydroxyls, as measured by loss on ignition (l.o.i.), is less than about 1%, and preferably less than about 0.5%, and most preferably less than 0.2%. Partially calcined pigments can have higher l.o.i. values, e.g., between about 1.5% and 2.0%, between about 2.0% and 5.0%. Typically, a laboratory full calcination is conducted at a final temperature of about 1000° C. to about 1050° C. for about 1 hour. However, any temperature and time regimen can be utilized that produces a fully calcined product, as described above. Kaolin, prior to calcination, typically has a l.o.i. of about 14%, and as the temperature rises in the calcining kiln, the percentage of residual hydroxyls drops. As stated above, the kaolin is fully calcined when the l.o.i. is less than about 1% and preferably less than about 0.5% or less than about 0.2%.

Any method of this invention utilizing calcining can include standard processing steps for preparing the feed for the calciner. Typically, such standard steps include flocculating the selected large particle clay fraction, optionally leaching to increase whiteness (depending upon the end-use), filtering, then either spray drying the filter cake (i.e., redisperse the filter cake, spray dry, and pulverize) or drying the filtrate on a regular drier and pulverizing. The dry feed is then fed into the calciner.

The present invention also provides a composition comprising a pigment comprising calcined kaolin having a median equivalent spherical diameter (e.s.d.) as measured on a Sedigraph 5100 of greater than about 2.0 microns and having $\leq$ about 15% less than 0.5 micron. The kaolin can have a median particle size distribution (e.s.d.) as measured on a Sedigraph 5100 of greater than 2.0 microns, greater than about 2.25 microns, more preferably greater than about 2.5 microns, greater than about 2.75 microns, greater than about 3.0 microns, greater than about 3.25 microns, or greater than about 3.5 microns, such as about 3.0 microns, about 3.5 microns, about 4.0 microns and about 4.5 microns; the kaolin also has less than or equal to about 15% less than 0.5 micron size particles, less than or equal to about 10%, less than or equal to about 8%, less than or equal to about 6%, e.g., 10%, 8%, 6% and as specifically seen in examples, 5.9%. The composition can further comprise a weathering-inert diluent. The kaolin can be fully calcined. For use in weathering-resistant paints, the clay in the composition is fully calcined kaolin. In another embodiment, the kaolin is partially calcined.

The present invention also provides a kaolin pigment composition having the following characteristics upon use in a paint formulation: relatively low sheen and good weathering characteristics (low change in color and low change in sheen upon exposure to weather conditions). Thus the present invention provides a weathering-resistant industrial coating or architectural coating composition comprising a pigment of this invention or a pigment made by a process of this invention. The process, as described in more detail above, comprises fully calcining a large particle size feed having a median particle size (median equivalents spherical diameter (e.s.d.) as measured on a Sedigraph 5100) of greater than 2.0 microns, greater than 2.25 microns, more preferably greater than 2.5 microns, greater than 2.75 microns, greater than 3.0 microns, greater than 3.25 microns, or greater than 3.5 microns; the feed also has less than or equal to about 15% less than 0.5 micron size particles, less than or equal to about 10%, less than or equal to about 8%, less than or equal to about 6%. The formulation can further comprise a weathering-inert diluent.

The present invention also provides a weathering-resistant industrial coating or architectural coating composition comprising a pigment of the present invention. Specifically the present invention provides a weathering-resistant industrial coating or architectural coating composition comprising calcined kaolin having a median equivalent spherical diameter (e.s.d.) as measured on a Sedigraph 5100 of greater than about 2.0 microns and having $\leq$ about 15% less than 0.5 micron. The formulation can further comprise a weathering-inert diluent.

The weathering-resistant industrial coating or architectural coating formulation can be made by standard methods, substituting the present pigment for the flatting or extender pigment in a standard paint. Thus, the present paints will have the characteristics described above for paints comprising the present inventive pigments. The paint composition can additionally contain, for example, the compounds exemplified in the examples herein as well as any other paint components.

The pigment preferably also contributes to the overall opacity (i.e., light scattering characteristics) when used in paint formulations containing titanium dioxide as the primary opacifying pigment. Examples of the present kaolin pigment composition is provided in the examples below.

By low sheen as used herein is typically meant that the 85° angle (termed in the data tables, "85 sheen" or "85 deg", and for change in sheen, "delta 85 deg") standard sheen measurement is less than about 10.0, more preferably less than about 7.5, more preferably less than about 5.0 and more preferably less than about 2.0, such as 2.0, 1.9, 1.8, 1.7.

By low change in color is meant that, upon formulation in a paint in any selected tint, the change in color with time, particularly upon exposure to weathering conditions, is low. Delta E, used in the examples to demonstrate low change is color, is a standard calculation of the difference in starting color as compared to the color at a later time point using several standard optical property measurements.

The present invention further comprises a method of making a pigment that, when used in an architectural paint formulation, provides a paint having low sheen, good opacity and good weathering characteristics (low change in color and low change in sheen upon exposure to weather conditions). This process comprises fully calcining an at least partially delaminated, mostly plate-like feed having a particle size range of the following: a median equivalents spherical diameter (e.s.d.) as measured on a Sedigraph 5100 of greater than about 2.5 microns, preferably greater than about 3.0 microns, more preferably about 3.5 microns, to produce a fully calcined pigment. As mentioned above, to prepare a feed for calcination, standard steps include flocculating the selected large particle clay fraction, optionally leaching to imcrease whiteness (depending upon the end-use), filtering, then either spray drying the filter cake (i.e., redisperse the filter cake, spray dry, and pulverize) or drying the filtrate on a regular drier and pulverizing. The dry feed is then fed into the calciner.

Thus the present invention specifically provides a method of producing a pigment comprising:

(a) delaminating a crude kaolin clay which can be fractionated to form two or more size fractions, one size fraction comprising a large particle size fraction, which large particle size fraction cannot be further effectively reduced in particle size by further delamination, (b) calcining a dry, pulverized feed obtained from the large particle size fraction from the delamination, the calcination product comprising the produced pigment. The present invention also provides a pigment produced by this method. If the kaolin is fully calcined, the pigment is particularly useful for weather-resistant paint formulations. Pigments prepared by either fully or partially calcining produce pigments that are good flatting agents.

Additionally, a weathering-inert diluent can be added to the feed to be calcined. Alternatively, a weathering-inert diluent can be added to the calcined pigment A pigment comprising such a weathering-inert diluent would be useful in weathering-resistant paint formulations.

The invention further provides a method of producing a pigment comprising (a) delaminating a crude kaolin fraction which delaminated crude fraction can be further fractionated to form two or more size fractions, one size fraction comprising a large particle size fraction, which large particle size fraction cannot be further effectively reduced in particle size by further delamination;

(b) calcining a dried feed obtained from the large particle size fraction from the delamination, the calcination product comprising the produced pigment. The present invention also provides a pigment produced by this method. If the kaolin is fully calcined, the pigment is particularly useful for weather-resistant paint formulations. Pigments prepared by either fully or partially calcining produce pigments that are good flatting agents.

Additionally, a weathering-inert diluent can be added to the feed to be calcined. Alternatively, a weathering-inert diluent can be added to the calcined pigment A pigment comprising such a weathering-inert diluent would be useful in weathering-resistant paint formulations.

Thus, a starting material for a process of this invention can comprise a crude kaolin, a fractionated crude kaolin, a fractionated, delaminated kaolin, or a combination of any of these, which meet the particle size description of this invention.

The present invention also provides a method of producing a pigment comprising (a) delaminating a crude kaolin or a crude kaolin fraction from which can be isolated a large particle size fraction, which large particle size fraction cannot be further effectively reduced in particle size by further delamination; (b) calcining a dry, pulverized feed obtained from the large particle size fraction from the delamination, the calcination product comprising the produced pigment The present invention additionally provides a method of producing a pigment comprising fully calcining a feed comprising a kaolin having a median equivalent spherical diameter (e.s.d.) as measured on a Sedigraph 5100 of greater than about 2.0 microns and having ≦15% less than 0.5 micron, thus producing the pigment. The feed can be a feed as further described above.

Also provided is a method of producing a pigment comprising fully calcining a feed comprising a kaolin and retaining a fraction having a median equivalent spherical diameter (e.s.d.) as measured on a Sedigraph 5100 of greater than about 2.0 microns and having ≦15% less than 0. 5 micron, the retained fraction comprising the pigment. The feed can be a feed as further described above.

The present invention also provides a method of producing a pigment comprising partially calcining a feed comprising a kaolin having a median equivalent spherical diameter (e.s.d.) as measured on a Sedigraph 5100 of greater than about 2.0 microns and having ≦15% less than 0.5 micron, thus producing the pigment.

The present invention is more particularly described in the following examples which are intended as illustrative only since numerous modifications and variations therein will be apparent to those skilled in the art.

EXAMPLES

Examples of paints formulated with the present inventive pigments and results of two long-term weatherexposure experiments are set forth in the following tables. Example 3 provides manufacturing procedures for making an exterior latex formulation. The methods described under Example 1 (Table 1–17) were also used in Example 2 (Tables 8–15) except where noted.

Optical properties (L, a, b) are measured using Technibrite micro TB-1C (Technidyne) or Hunter Ultrascan XE instrument, by standard method. Gloss is measured using the Hunter PRO-3 gloss meter (HunterLab (Reston, Va.)).

Delta E, measured in Examples 1 and 2, is a standard calculation of the difference in starting color as compared to the color at a later time point using several standard optical property measurements. Briefly, delta E is the square root of the sum of (1) the difference in L value (whiteness or blackness) squared, (2) the difference in A value (redness or greenness) squared, and (3) the difference in B value (blueness or yellowness) squared, each difference being the difference between the value prior to exposure and the value after exposure.

Example 1

Architectural formulations based upon various pigments were prepared as set forth in the each of several tables below, following the procedure set forth in Example 3. Over a time period of exposure to weathering, relevant color and sheen data, e.g., delta E, delta L, absolute L, delta a, delta b, delta 85 degree, 85 degree values, were obtained for each formulation as set forth below.

Details of the paint formulations used with the previous products and with the present inventive product (for comparison) are provided below.

Pigments

Nepheline Syenite

"MINEX 4" and "MINEX 7" stand for MINEX® 4 and MINEX® 7, respectively, products of Unimin Specialty Materials, Inc. (Nephton, Ontario) and they are nepheline syenites. Table 2 (below) provides the formulation (P3159) used for both a Minex 4-based and a Minex 7-based architectural coating formulation. Formulations using these pigments are generally considered to have good characteristics for exterior paints. As shown below, formulations comprising the present inventive kaolin pigments have improved weathering characteristics.

Microcrystalline Silica

"Imsil 1240" and "Imsil A-15" are products of Unimin Specialty Materials, Inc. (Elco, Ill.), and they are microcrystalline silica. Table 2 provides the formulation (P3159) used for both an Imsil 1240 architectural coating formulation and an Imsil A-15 architectural coating formulation. Formulations using these pigments are generally considered to have good characteristics for exterior paints. As shown below, formulations comprising the present inventive kaolin pigments have improved weathering characteristics.

Hydrous Kaolin Clay

"Hydrite® Flat D" is a product of Dry Branch Kaolin Company (Dry Branch, Ga.), and it is a hydrous kaolin clay. Table 2 (P3159) and Table 1 (P5384) each provide an architectural coating formulation prepared using Hydrite® Flat D. Of the hydrous kaolins tested, only the kaolins providing the better weathering results are set forth. Thus the improvement in weathering provided by use of the inventive pigments (calcined, large particle) over these hydrous pigments is clearly demonstrated.

Calcined Kaolin Clay

GLOMAX® LL is a calcined kaolin clay (intermediate particle size) used in an architectural coating formulation, labeled in the tables as "GLOMAX® LL." GLOMAX® LL is a product of Dry Branch Kaolin Company (Dry Branch, Ga.), and it is a calcined kaolin pigment having a median particle size of about 60% at 2.0 as measured on a Sedigraph 5100. Table 1 sets forth an architectural coating formulation (P5384) prepared using GLOMAX® LL. The data below show clearly that the present inventive pigments provide superior performance over this intermediate particle size calcined kaolin clay.

Calcined Kaolin Clay, Large Particle

Any pigment of this invention may be referred to in the data as "coarse calcined" kaolin.

(A). "CL93-61A calcined" is a large particle size, calcined clay. To produce "CL93-61A calcined", a hydrous clay was delaminated, and large particle fraction that could not be effectively further delaminated was isolated and calcined according to standard methods at standard temperatures until fully calcined (i.e., l.o.i. less than 1.0). "CL93-61A calcined" is a large particle size clay of the present invention. Table 2 provides an architectural coating formula (P3159) for a formulation prepared using "CL93-61A calcined" ("calcined kaolin"). Paints formulated with this pigment are weather-resistant paints of this invention.

(B) EFP is a fully calcined, large particle kaolin of this invention. To produce EFP, large particle hydrous kaolin was calcined according to standard methods at standard temperatures until fully calcined (i.e., l.o.i. less than 1.0). Coating formulations comprising EFP are examples of a coating formulation of the invention. EFP has a median particle size of about 3.5 e.s.d. as measured on a Sedigraph 5100. An architectural coating formulation prepared with EFP (P5384) is set forth in Table 1 ("calcined kaolin"). Paints formulated with this pigment are weather-resistant paints of this invention.

Coating Formulae

Two formulations for coatings using the various kaolin pigments were used, one designated "P5384" and one designated "P3159". The two formulations differ slightly in the actual number of pounds of the components used. The formulation for P5384 is set forth in Table 1.

TABLE 1

P5384 FORMULA
POUNDS PER 100 GALLONS

| PVC | 37.6% | 37.6% |
|---|---|---|
| Water | 238.5 | 238.5 |
| KTPP | 1.8 | 1.8 |
| Tamol 731 | 7.9 | 7.9 |
| Igepal CO-610 | 3.9 | 3.9 |
| Triton N-101 | 2.5 | 2.5 |
| Colloids 681F | 3.0 | 3.0 |
| TiO$_2$ CR-822 | 123.2 | 123.2 |
| Hydrite Flat D | 197.1 | — |
| Calcined Kaolin | — | 199.3 |
| Sift the Natrosol in slowly while mixing. | | |
| Natrosol 250 HR | 3.9 | 3.9 |
| Disperse, then add the following slowly while mixing. | | |
| Ucar 367 | 369.6 | 369.6 |
| Ethylene Glycol | 24.6 | 24.6 |
| Texanol | 9.9 | 9.9 |
| Water | 94.6 | 94.6 |

The formulation for P3159 is set forth in Table 2.

TABLE 2

P3159 FORMULA
POUNDS PER 100 GALLONS

| PVC | 39.0% | 39.0% | 39.0% | 39.0% |
|---|---|---|---|---|
| Water | 234.3 | 234.3 | 234.3 | 234.3 |
| KTPP | 1.7 | 1.7 | 1.7 | 1.7 |
| Tamol 731 | 7.7 | 7.7 | 7.7 | 7.7 |
| Igepal CO-610 | 3.9 | 3.9 | 3.9 | 3.9 |
| Colloids 681F | 2.9 | 2.9 | 2.9 | 2.9 |
| TiO$_2$ CR-822 | 121.0 | 121.0 | 121.0 | 121.0 |
| Minex 4 or 7 | 217.8 | — | — | — |
| Imsil 1240 or A-15 | — | 221.0 | — | — |
| Hydrite Flat D | — | — | 217.3 | — |
| CL-93 - 61A Calcined or Glomax LL (both Calcined) | — | — | — | 220.0 |
| Sift the Natrosol in slowly while mixing. | | | | |
| Natrosol 250 HR | 3.9 | 3.9 | 3.9 | 3.9 |
| Disperse, then add the following slowly while mixing. | | | | |
| Ucar 376 | 363.0 | 363.0 | 363.0 | 363.0 |
| Ethylene Glycol | 24.2 | 24.2 | 24.2 | 24.2 |
| Texanol | 9.7 | 9.7 | 9.7 | 9.7 |
| Water | 92.9 | 92.9 | 92.9 | 92.9 |

Commercially available products used in coatings formulations in the examples are set forth in Table 3.

TABLE 3

| PRODUCT | COMPANY |
|---|---|
| KTPP | FMC |
| TAMOL 731 | ROHM AND HAAS |
| IGEPAL CO-610 | RHONE-POULENC |
| TRITON N-101 | UNION CARBIDE |
| COLLOIDS 681F | RHONE-POULENC |
| TI02 (CR-822) | KERR-MCGEE |
| TI02 (OR-600I) | KEMIRA |
| NATROSOL 250 HR | AQUALON |
| UCAR 376 | UNION CARBIDE |
| UCAR 367 | UNION CARBIDE |
| ETHYLENE GLYCOL | EASTMAN |
| TEXANOL | EASTMAN |

Exposure Data

Outdoor Exposure

Duplicate test boards coated with the formulations were placed at a 45° angle facing south for 30 months. Data were taken at time points during the 30 months. Technibrite micro TB-IC was used for optical property measurements.

Sheen

The 85° angle standard sheen measurement (termed in the data tables, "85 sheen" or "85 deg", and for change in sheen, "delta 85 deg") was performed on the coating formulations set forth above.

Color

Change in color, delta E, can be determined, for a formulation in any selected tint, by measuring the change in color with time, particularly upon exposure to weathering conditions. Test panels were exposed to weathering conditions as described, and color (L value, A value, and B value) monitored. From this data, delta E was obtained (the square root of the sum of (1) the difference in L value (whiteness or blackness) squared, (2) the difference in A value (redness or greenness) squared, and (3) the difference in B value (blueness or yellowness) squared, each difference being the difference between the value prior to exposure and the value after exposure).

Table 4 sets forth data obtained over 30 months for architectural coating formulations (3159; formulations of Table 15) comprising the material set forth (i.e., MINEX 4, MINEX 7, IMSIL 1240, IMSIL A-15, Hydrite Flat D (hydrous), GLOMAX® LL (calcined), "CL93-86 calcined" (calcined large particle). Data from two test panels are presented.

TABLE 4

PART A
EXTERIOR EXPOSURE - DRY BRANCH GEORGIA

| P31590S | | | NOT EXPOSED | | 60 | 85 |
|---|---|---|---|---|---|---|
| PRODUCT | | L | a | b | GLOSS | SHEEN |
| MINEX 4 | | | | | | |
| A | 4 | 62.24 | −32.09 | −4.48 | 0.00 | 3.3 | 2.9 |
| A | 5 | 62.13 | −32.16 | −4.66 | 0.22 | 3.4 | 2.9 |
| MINEX 7 | | | | | | |
| B | 4 | 62.78 | −32.22 | −4.67 | 0.59 | 3.0 | 4.6 |
| B | 5 | 62.73 | −32.29 | −4.63 | 0.55 | 3.0 | 4.5 |
| IMSIL 1240 | | | | | | |
| C | 4 | 62.13 | −31.81 | −4.50 | 0.30 | 2.6 | 1.3 |
| C | 5 | 62.06 | −31.84 | −4.41 | 0.32 | 2.6 | 1.3 |
| IMSIL A-15 | | | | | | |
| D | 4 | 62.63 | −32.26 | −4.52 | 0.43 | 3.1 | 4.3 |
| D | 5 | 62.62 | −32.34 | −4.5 | 0.46 | 3.1 | 4.5 |
| HYDRITE FLAT D | | | | | | |
| G | 4 | 62.54 | −32.01 | −4.44 | 0.31 | 3.2 | 5.4 |
| G | 5 | 62.56 | −32.03 | −4.43 | 0.33 | 3.3 | 5.6 |
| GLOMAX LL CALCINED | | | | | | |
| L | 4 | 65.96 | −32.03 | −4.26 | 3.73 | 1.5 | 5.5 |
| L | 5 | 65.94 | −32.08 | −4.26 | 3.71 | 1.5 | 5.6 |
| CL93-61A CALCINED | | | | | | |
| M | 4 | 63.00 | −32.17 | −4.31 | 0.78 | 1.6 | 1.6 |
| M | 5 | 62.99 | −32.18 | −4.30 | 0.78 | 1.6 | 1.6 |
| AVER | A | 62.19 | −32.13 | −4.57 | 0.11 | 3.35 | 2.90 |
| AVER | B | 62.76 | −32.26 | −4.65 | 0.57 | 3.00 | 4.55 |
| AVER | C | 62.10 | −31.83 | −4.46 | 0.31 | 2.60 | 1.30 |
| AVER | D | 62.63 | −32.30 | −4.51 | 0.44 | 3.10 | 4.40 |
| AVER | G | 62.55 | −32.02 | −4.44 | 0.32 | 3.25 | 5.50 |
| AVER | L | 65.95 | −32.06 | −4.26 | 3.72 | 1.50 | 5.55 |
| AVER | M | 63.00 | −32.18 | −4.31 | 0.78 | 1.60 | 1.60 |

TABLE 4

PART B
EXTERIOR EXPOSURE - DRY BRANCH GEORGIA

| | | | | 30 Months Exposure | | |
|---|---|---|---|---|---|---|
| P31590S PRODUCT | | L | a | b | 60 GLOSS | 85 SHEEN |
| MINEX 4 | | | | | | |
| A | | 61.97 | −31.32 | −3.53 | 1.9 | 4.1 |
| A | | 60.85 | −34.02 | −3.45 | 2.2 | 5.3 |
| MINEX 7 | | | | | | |
| B | | 62.08 | −33.80 | −3.75 | 2.3 | 9.4 |
| B | | 62.57 | −33.55 | −3.86 | 2.4 | 10.0 |
| IMSIL 1240 | | | | | | |
| C | | 59.86 | −33.50 | −3.34 | 1.6 | 1.4 |
| C | | 59.81 | −33.03 | −3.34 | 1.6 | 1.3 |
| IMSIL A-15 | | | | | | |
| D | | 61.47 | −32.12 | −3.80 | 2.0 | 5.2 |
| D | | 60.62 | −33.56 | −3.53 | 2.2 | 6.1 |
| HYDRITE FLAT D | | | | | | |
| G | | 61.90 | −31.06 | −3.83 | 2.9 | 10.6 |
| G | | 62.17 | −31.32 | −3.82 | 3.2 | 12.3 |
| GLOMAX LL CALCINED | | | | | | |
| L | | 67.14 | −29.46 | −3.86 | 2.0 | 14.7 |
| L | | 67.20 | −30.11 | −3.89 | 2.1 | 16.1 |
| CL93-61A CALCINED | | | | | | |
| M | | 63.80 | −30.93 | −3.45 | 2.1 | 4.1 |
| M | | 64.13 | −30.89 | −3.50 | 2.2 | 4.4 |
| AVER | A | 61.41 | −32.67 | −3.49 | 2.1 | 4.7 |
| AVER | B | 62.33 | −33.68 | −3.81 | 2.4 | 9.7 |
| AVER | C | 59.84 | −33.27 | −3.34 | 1.6 | 1.4 |
| AVER | D | 61.05 | −32.84 | −3.67 | 2.1 | 5.7 |
| AVER | G | 62.04 | −31.19 | −3.83 | 3.1 | 11.5 |
| AVER | L | 67.17 | −29.79 | −3.88 | 2.1 | 15.4 |
| AVER | M | 63.97 | −30.91 | −3.48 | 2.2 | 4.3 |

TABLE 4

PART C

| P31590S PRODUCT | | DELTA E | DELTA 60 GLOSS | DELTA 85 SHEEN |
|---|---|---|---|---|
| MINEX 4 | | | | |
| A | | 1.25 | 1.4 | -1.2 |
| A | | 2.56 | 1.2 | -2.4 |
| MINEX 7 | | | | |
| B | | 1.96 | 0.7 | -4.8 |
| B | | 1.49 | 0.6 | -5.5 |
| IMSIL 1240 | | | | |
| C | | 3.06 | 1.0 | -0.1 |
| C | | 2.76 | 1.0 | 0.0 |
| IMSIL A-15 | | | | |
| D | | 1.37 | 1.1 | -0.9 |
| D | | 2.54 | 0.9 | -1.6 |
| HYDRITE FLAT D | | | | |
| G | | 1.30 | 0.3 | -5.2 |
| G | | 1.01 | 0.1 | -6.7 |
| GLOMAX LL CALCINED | | | | |
| L | | 2.86 | -.05 | -9.2 |
| L | | 2.37 | -0.6 | -10.5 |
| CL93-61A CALCINED | | | | |
| M | | 1.71 | -0.5 | -2.5 |
| M | | 1.90 | -0.6 | -2.8 |
| AVER | A | 1.91 | 1.3 | -1.8 |
| AVER | B | 1.72 | 0.7 | -5.2 |
| AVER | C | 2.91 | 1.0 | 0.0 |
| AVER | D | 1.95 | 1.0 | -1.3 |
| AVER | G | 1.16 | 0.2 | -6.0 |
| AVER | L | 2.61 | -0.6 | -9.9 |
| AVER | M | 1.80 | -0.6 | -2.7 |

From the data set forth in Table 1 it can be noted that a paint formulation made with a product of this invention, "CL93-61A calcined," has only a small change (relative to e.g., GLOMAX® LL) in sheen over the time course. "CL93-61A calcined" also demonstrated a low delta E, particularly relative to GLOMAX® LL, which demonstrated poorly on sheen and chalking. Thus, the formulations comprising large particle size calcined kaolin demonstrate excellent weathering characteristics.

Simulated Weathering Exposure

Simulated weathering conditions under ASTM standard D 4587-91 in a Q.U.V. Accelerated Weathering Tester (The Q-Panel Company, Cleveland, Ohio) through a cycle of 4 hours UV (70° F.) and 4 hours condensation (60° F.) were performed over a selected period of exposure, and measurements taken at selected time intervals. Color and sheen data were collected as described above. Technibrite micro TB-IC was used for optical property measurements.

Tables 5 and 6 set forth data obtained with architectural formulations (5384; Table 14) under simulated weathering conditions. Coating formulations-type comprising the kaolins set forth in Table 5 and 6 (i.e., Hydrite Flat D (coarse hydrous kaolin) and EFP (calcined, large particle kaolin)) were prepared. Three test panels were run. Delta 85 deg was measured after 473 hours' exposure to simulated weathering conditions under ASTM standard D 4587-91 in a Q.U.V. Accelerated Weathering Tester (The Q-Panel Company, Cleveland, Ohio) through a cycle of 4 hours UV (70° F.) and 4 hours condensation (60° F.).

TABLE 5

PART A

| P5384Q2 Product | Start 20 DEG | 60 DEG | 85 DEG | L | a | b |
|---|---|---|---|---|---|---|
| P5384A (COMP. COARSE HYDROUS KAOLIN) | | | | | | |
| Panel 1 | 0.9 | 4.8 | 7.3 | 70.61 | -7.64 | -26.59 |
| Panel 2 | 0.9 | 4.9 | 5.0 | 70.41 | -7.50 | -27.37 |
| Panel 3 | 0.9 | 4.9 | 6.1 | 70.47 | -7.49 | -27.26 |
| P5384B (HYDRITE FLAT B) | | | | | | |
| Panel 1 | 0.9 | 4.8 | 7.2 | 70.73 | -7.49 | -27.27 |
| Panel 2 | 0.9 | 4.7 | 6.1 | 70.73 | -7.51 | -27.17 |
| Panel 3 | 0.9 | 4.7 | 6.9 | 70.76 | -7.47 | -26.59 |
| P5384C (HYDRITE FLAT D 113095) | | | | | | |
| Panel 1 | 0.8 | 4.7 | 4.7 | 70.33 | -7.57 | -26.91 |
| Panel 2 | 0.9 | 4.9 | 5.2 | 70.28 | -7.50 | -27.61 |
| Panel 3 | 0.9 | 4.9 | 7.8 | 70.25 | -7.53 | -27.48 |
| P5384D (HYDRITE FLAT D120895) | | | | | | |
| Panel 1 | 0.9 | 5.0 | 4.6 | 70.25 | -7.51 | -27.28 |
| Panel 2 | 0.9 | 5.0 | 4.6 | 70.25 | -7.56 | -27.32 |
| Panel 3 | 0.9 | 4.9 | 4.8 | 70.25 | -7.55 | -27.13 |
| P5384E (EFP) | | | | | | |
| Panel 1 | 0.7 | 2.4 | 1.9 | 72.43 | -6.95 | -26.79 |
| Panel 2 | 0.7 | 2.4 | 1.9 | 72.51 | -6.93 | -27.25 |
| Panel 3 | 0.7 | 2.4 | 1.9 | 72.48 | -7.01 | -26.85 |
| AVERAGE | | | | | | |
| P5384A | 0.9 | 4.9 | 6.1 | 70.50 | -7.54 | -27.07 |
| P5384B | 0.9 | 4.7 | 6.7 | 70.74 | -7.49 | -27.01 |
| P5384C | 0.9 | 4.8 | 5.9 | 70.29 | -7.53 | -27.33 |
| P5384D | 0.9 | 5.0 | 4.7 | 70.25 | -7.54 | -27.24 |
| P5384E | 0.7 | 2.4 | 1.9 | 72.47 | -6.96 | -26.96 |
| P5384F | 0.9 | 5.1 | 8.2 | 70.74 | -7.37 | -28.01 |

TABLE 5

PART B

| P5384Q2 Product | 64.6 Hrs. 60 DEG | 85 DEG | L | a | b |
|---|---|---|---|---|---|
| P5384A (COMP. COARSE HYDROUS KAOLIN) | | | | | |
| Panel 1 | 2.3 | 3.1 | 71.80 | -7.79 | -23.83 |
| Panel 2 | 2.6 | 3.8 | 71.86 | -7.78 | -24.08 |
| Panel 3 | 2.4 | 3.5 | 72.07 | -7.73 | -23.95 |
| P5384B (HYDRITE FLAT D) | | | | | |
| Panel 1 | 2.3 | 4.1 | 72.13 | -7.75 | -23.94 |
| Panel 2 | 2.3 | 4.7 | 72.32 | -7.72 | -23.79 |
| Panel 3 | 2.3 | 4.1 | 72.14 | -7.71 | -23.62 |
| P5384C (HYDRITE FLAT D 113095) | | | | | |
| Panel 1 | 2.3 | 3.3 | 71.83 | -7.76 | -24.24 |
| Panel 2 | 2.3 | 3.3 | 71.97 | -7.78 | -23.96 |
| Panel 3 | 2.3 | 3.2 | 71.82 | -7.74 | -24.14 |
| P5384D (HYDRITE FLAT D 120895) | | | | | |
| Panel 1 | 2.4 | 3.3 | 71.57 | -7.76 | -24.23 |
| Panel 2 | 2.3 | 3.1 | 71.73 | -7.77 | -24.06 |
| Panel 3 | 2.3 | 3.2 | 71.86 | -7.71 | -24.00 |
| P5384E (EFP) | | | | | |
| Panel 1 | 1.0 | 1.0 | 72.89 | -7.05 | -25.26 |
| Panel 2 | 1.0 | 1.0 | 72.69 | -7.10 | -24.81 |
| Panel 3 | 1.0 | 0.9 | 72.97 | -7.10 | -25.06 |
| AVERAGE | | | | | |
| P5384A | 2.4 | 3.5 | 71.91 | -7.77 | -23.95 |
| P5384B | 2.3 | 4.3 | 72.20 | -7.73 | -23.78 |
| P5384C | 2.3 | 3.3 | 71.87 | -7.76 | -24.11 |

TABLE 5-continued

PART B

| P5384Q2 Product | 64.6 Hrs. 60 DEG | 85 DEG | L | a | b |
|---|---|---|---|---|---|
| P5384D | 2.3 | 3.2 | 71.72 | −7.75 | −24.10 |
| P5384E | 1.0 | 1.0 | 72.85 | −7.08 | −25.04 |
| P5384F | 2.3 | 4.2 | 72.33 | −7.46 | −24.92 |

TABLE 5

PART C

| P5384Q2 Product | Delta 60 DEG | Delta 85 DEG | Delta L | Delta a | Delta b | Delta E |
|---|---|---|---|---|---|---|
| P5384A (COMP. COARSE HYDROUS KAOLIN) | | | | | | |
| Panel 1 | 2.5 | 4.2 | −1.19 | 0.15 | −2.76 | 3.01 |
| Panel 2 | 2.3 | 1.2 | −1.45 | 0.28 | −3.29 | 3.61 |
| Panel 3 | 2.5 | 2.6 | −1.60 | 0.24 | −3.31 | 3.68 |
| P5384B (HYDRITE FLAT D) | | | | | | |
| Panel 1 | 2.5 | 3.1 | −1.40 | 0.26 | −3.33 | 3.62 |
| Panel 2 | 2.4 | 1.4 | −1.59 | 0.21 | −3.38 | 3.74 |
| Panel 3 | 2.4 | 2.8 | −1.38 | 0.24 | −2.97 | 3.28 |
| P5384C (HYDRITE FLAT D 113095) | | | | | | |
| Panel 1 | 2.4 | 1.4 | −1.50 | 0.19 | −2.67 | 3.07 |
| Panel 2 | 2.6 | 1.9 | −1.69 | 0.28 | −3.65 | 4.03 |
| Panel 3 | 2.6 | 4.6 | −1.57 | 0.21 | −3.34 | 3.70 |
| P5384D (HYDRITE FLAT D 120895) | | | | | | |
| Panel 1 | 2.6 | 1.3 | −1.32 | 0.25 | −3.05 | 3.33 |
| Panel 2 | 2.7 | 1.5 | −1.48 | 0.21 | −3.26 | 3.59 |
| Panel 3 | 2.6 | 1.6 | −1.61 | 0.16 | −3.13 | 3.52 |
| P5384E (EFP) | | | | | | |
| Panel 1 | 1.4 | 0.9 | −0.46 | 0.10 | −1.53 | 1.60 |
| Panel 2 | 1.4 | 0.9 | −0.18 | 0.17 | −2.44 | 2.45 |
| Panel 3 | 1.4 | 1.0 | −0.49 | 0.09 | −1.79 | 1.86 |
| AVERAGE | | | | | | |
| P5384A | 2.4 | 2.7 | −1.41 | 0.22 | −3.12 | 3.43 |
| P5384B | 2.4 | 2.4 | −1.46 | 0.24 | −3.23 | 3.55 |
| P5384C | 2.5 | 2.6 | −1.59 | 0.23 | −3.22 | 3.60 |
| P5384D | 2.6 | 1.5 | −1.47 | 0.21 | −3.15 | 3.48 |
| P5384E | 1.4 | 0.9 | −0.38 | 0.12 | −1.92 | 1.97 |
| P5384F | 2.8 | 4.0 | −1.59 | 0.09 | −3.09 | 3.48 |

TABLE 5

PART D

| P5384Q2 Product | 237 Hrs 60 DEG | 85 DEG | L | a | b |
|---|---|---|---|---|---|
| P5384A (COMP. COARSE HYDROUS KAOLIN) | | | | | |
| Panel 1 | 4.9 | 7.7 | 72.14 | −7.64 | −23.98 |
| Panel 2 | 5.5 | 9.7 | 72.29 | −7.59 | −24.19 |
| Panel 3 | 5.0 | 7.5 | 72.32 | −7.57 | −24.17 |
| P5384B (HYDRITE FLAT D) | | | | | |
| Panel 1 | 5.0 | 9.6 | 72.35 | −7.53 | −24.13 |
| Panel 2 | 4.8 | 9.0 | 72.43 | −7.60 | −23.95 |
| Panel 3 | 5.2 | 10.0 | 72.44 | −7.60 | −23.66 |
| P5384C (HYDRITE FLAT D 113095) | | | | | |
| Panel 1 | 5.1 | 7.9 | 71.99 | −7.56 | −24.65 |
| Panel 2 | 4.9 | 7.9 | 72.09 | −7.64 | −24.33 |
| Panel 3 | 5.0 | 7.7 | 72.05 | −7.60 | −24.24 |
| P5384D (HYDRITE FLAT D 120895) | | | | | |
| Panel 1 | 5.5 | 7.8 | 71.83 | −7.65 | −24.41 |
| Panel 2 | 5.4 | 8.1 | 71.92 | −7.59 | −24.35 |
| Panel 3 | 5.0 | 7.4 | 72.05 | −7.62 | −24.20 |
| P5384E (EFP) | | | | | |
| Panel 1 | 2.5 | 2.6 | 73.11 | −6.98 | −25.25 |
| Panel 2 | 2.5 | 2.4 | 72.97 | −7.02 | −24.91 |
| Panel 3 | 2.4 | 2.5 | 73.10 | −7.00 | −24.97 |
| AVERAGE | | | | | |
| P5384A | 5.1 | 8.3 | 72.25 | −7.60 | −24.11 |
| P5384B | 5.0 | 9.5 | 72.41 | −7.58 | −23.91 |
| P5384C | 5.0 | 7.8 | 72.04 | −7.60 | −24.41 |
| P5384D | 5.3 | 7.8 | 71.93 | −7.62 | −24.32 |
| P5384E | 2.5 | 2.5 | 73.06 | −7.00 | −25.04 |
| P5384F | 5.0 | 9.7 | 72.52 | −7.32 | −24.92 |

TABLE 5

PART E

| P5384Q2 Product | Delta 60 DEG | Delta 85 DEG | Delta L | Delta a | Delta b | Delta E |
|---|---|---|---|---|---|---|
| P5384A (COMP. COARSE HYDROUS KAOLIN) | | | | | | |
| Panel 1 | −0.1 | −0.4 | −1.53 | 0.00 | −2.61 | 3.03 |
| Panel 2 | −0.6 | −4.7 | −1.88 | 0.09 | −3.18 | 3.70 |
| Panel 3 | −0.1 | −1.4 | −1.85 | 0.08 | −3.09 | 3.60 |
| P5384B (HYDRITE FLAT D) | | | | | | |
| Panel 1 | −0.2 | −2.4 | −1.62 | 0.04 | −3.14 | 3.53 |
| Panel 2 | −0.1 | −2.9 | −1.70 | 0.09 | −3.22 | 3.64 |
| Panel 3 | −0.5 | −3.1 | −1.68 | 0.13 | −2.93 | 3.38 |
| P5384C (HYDRITE FLAT D 113095) | | | | | | |
| Panel 1 | −0.4 | −3.2 | −1.66 | −0.01 | −2.26 | 2.80 |
| Panel 2 | 0.0 | −2.7 | −1.81 | 0.14 | −3.28 | 3.75 |
| Panel 3 | −0.1 | 0.1 | −1.80 | 0.07 | −3.24 | 3.71 |
| P5384D (HYDRITE FLAT D 120895) | | | | | | |
| Panel 1 | −0.5 | −3.2 | −1.58 | 0.14 | −2.87 | 3.28 |
| Panel 2 | −0.4 | −3.5 | −1.67 | 0.03 | −2.97 | 3.41 |
| Panel 3 | −0.1 | −2.6 | −1.80 | 0.07 | −2.93 | 3.44 |
| P5384E (EFP) | | | | | | |
| Panel 1 | −0.1 | −0.7 | −0.68 | 0.03 | −1.54 | 1.68 |
| Panel 2 | −0.1 | −0.5 | −0.46 | 0.09 | −2.34 | 2.39 |
| Panel 3 | 0.0 | −0.6 | −0.62 | −0.01 | −1.88 | 1.98 |
| AVERAGE | | | | | | |
| P5384A | −0.3 | −2.2 | −1.75 | 0.06 | −2.96 | 3.44 |
| P5384B | −0.3 | −2.8 | −1.67 | 0.09 | −3.10 | 3.52 |
| P5384C | −0.2 | −1.9 | −1.76 | 0.07 | −2.93 | 3.42 |
| P5384D | −0.3 | −3.1 | −1.68 | 0.08 | −2.92 | 3.38 |
| P5384E | −0.1 | −0.6 | −0.59 | 0.04 | −1.92 | 2.02 |
| P5384F | −0.1 | −1.5 | −1.78 | −0.05 | −3.09 | 3.58 |

TABLE 6

PART A

| P5384Q2 - Start PRODUCT | 60 DEG | 85 DEG | L | a | b |
|---|---|---|---|---|---|
| P5384D (HYDRITE FLAT D 120895) COARSE HYDRITE | | | | | |
| PANEL 1 | 5.0 | 4.6 | 70.25 | −7.51 | −27.28 |
| PANEL 2 | 5.0 | 4.6 | 70.25 | −7.56 | −27.32 |

TABLE 6-continued

PART A

P5384Q2 - Start

| PRODUCT | 60 DEG | 85 DEG | L | a | b |
|---|---|---|---|---|---|
| PANEL 3 | 4.9 | 4.8 | 70.25 | −7.55 | −27.13 |
| P5384E (EFP) (COARSE CALCINED) | | | | | |
| PANEL 1 | 2.4 | 1.9 | 72.43 | −6.95 | −26.79 |
| PANEL 2 | 2.4 | 1.9 | 72.51 | −6.93 | −27.25 |
| PANEL 3 | 2.4 | 1.9 | 72.48 | −7.01 | −26.85 |
| AVERAGE | | | | | |
| P5384D | 5.0 | 4.7 | 70.25 | −7.54 | −27.24 |
| P5384E | 2.4 | 1.9 | 72.47 | −6.96 | −26.96 |

TABLE 6

PART B-1
P5384Q2 START 351 HRS

| P5384Q2 Start PRODUCT | 351 HRS 60 DEG | 85 DEG | L | a | b |
|---|---|---|---|---|---|
| P5384D (HYDRITE FLAT D 120895) COARSE HYDRITE | | | | | |
| PANEL 1 | 4.8 | 7.3 | 72.13 | −7.76 | −23.97 |
| PANEL 2 | 4.7 | 6.8 | 72.21 | −7.75 | −24.07 |
| PANEL 3 | 4.4 | 6.5 | 72.31 | −7.77 | −23.98 |
| P5384E (EFP) (COARSE CALCINED) | | | | | |
| PANEL 1 | 2.4 | 2.3 | 73.25 | −7.02 | −24.93 |
| PANEL 2 | 2.4 | 2.3 | 73.14 | −7.14 | −24.57 |
| PANEL 3 | 2.3 | 2.5 | 73.20 | −7.14 | −24.49 |
| AVERAGE | | | | | |
| P5384D | 4.6 | 6.9 | 72.22 | −7.76 | −24.01 |
| P5384E | 2.4 | 2.4 | 73.20 | −7.10 | −24.66 |

TABLE 6

PART B-2

| P5384Q2 PRODUCT | Start 351 Hrs Delta 60 DEG | Delta 85 DEG | Delta L | Delta a | Delta b | Delta E |
|---|---|---|---|---|---|---|
| P5384D (HYDRITE FLAT D 120895) COARSE HYDRITE | | | | | | |
| PANEL 1 | 0.2 | −2.7 | −1.88 | 0.25 | −3.31 | 3.8 |
| PANEL 2 | 0.3 | −2.2 | −1.96 | 0.19 | −3.25 | 3.8 |
| PANEL 3 | 0.5 | −1.7 | −2.06 | 0.22 | −3.15 | 3.7 |
| P5384E (EFP) (COARSE CALCINED) | | | | | | |
| PANEL 1 | 0.0 | −0.4 | −0.82 | 0.07 | −1.86 | 2.0 |
| PANEL 2 | 0.0 | −0.4 | −0.63 | 0.21 | −2.68 | 2.7 |
| PANEL 3 | 0.1 | −0.6 | −0.72 | 0.13 | −2.36 | 2.4 |
| AVERAGE | | | | | | |
| P5384D | 0.3 | −2.2 | −1.97 | 0.22 | −3.24 | 3.8 |
| P5384E | 0.0 | −0.5 | −0.72 | 0.14 | −2.30 | 2.4 |

TABLE 6

PART C-1

| P5384Q2 Start PRODUCT | 473 Hrs. 60 DEG | Exposure in QUV 85 DEG | L | a | b |
|---|---|---|---|---|---|
| P5384D (HYDRITE FLAT D 120895) COARSE HYDRITE | | | | | |
| PANEL 1 | 4.4 | 5.5 | 72.06 | −7.60 | −23.97 |
| PANEL 2 | 4.2 | 6.0 | 72.15 | −7.64 | −24.08 |
| PANEL 3 | 3.7 | 5.0 | 72.23 | −7.55 | −24.15 |
| P5384E (EFP) (COARSE CALCINED) | | | | | |
| PANEL 1 | 2.3 | 2.0 | 73.17 | −6.90 | −24.85 |
| PANEL 2 | 2.3 | 2.1 | 72.99 | −6.97 | −24.33 |
| PANEL 3 | 2.4 | 2.1 | 73.18 | −6.96 | −24.74 |
| AVERAGE | | | | | |
| P5384D | 4.1 | 5.5 | 72.15 | −7.60 | −24.07 |
| P5384E | 2.3 | 2.1 | 73.11 | −6.94 | −24.64 |

TABLE 6

PART C-2
P5384Q2 START 473 Hours Exposure In QUV

| | DELTA 60 DEG | DELTA 85 DEG | DELTA L | DELTA a | DELTA b | DELTA E |
|---|---|---|---|---|---|---|
| P5384D (HYDRITE FLAT D 120895) COARSE HYDRITE | | | | | | |
| PANEL 1 | 0.6 | −0.9 | −1.81 | 0.09 | −3.31 | 3.77 |
| PANEL 2 | 0.8 | −1.4 | −1.90 | 0.08 | −3.24 | 3.76 |
| PANEL 3 | 1.2 | −0.2 | −1.98 | 0.00 | −2.98 | 3.58 |
| P5384E (EFP) (COARSE CALCINED) | | | | | | |
| PANEL 1 | 0.1 | −0.1 | −0.74 | −0.05 | −1.94 | 2.08 |
| PANEL 2 | 0.1 | −0.2 | −0.48 | 0.04 | −2.92 | 2.96 |
| PANEL 3 | 0.0 | −0.2 | −0.70 | −0.05 | −2.11 | 2.22 |
| AVERAGE | | | | | | |
| P5384D | 0.9 | −0.8 | −1.90 | 0.06 | −3.18 | 3.70 |
| P5384E | 0.1 | −0.2 | −0.64 | −0.02 | −2.32 | 2.42 |

Table 7 sets forth delta E data obtained under simulated weathering conditions under ASTM standard D 4587-91 in a Q.U.V. Accelerated Weathering Tester (The Q-Panel Company, Cleveland, Ohio) through a cycle of 4 hours UV (70° F.) and 4 hours condensation (60° F.) over 5351 hours for architectural coating formulations (3159) comprising the material specified in the table.

TABLE 7

PART A

| PN3159B | COLOR CHANGE - QUV DELTA E | | | | | |
|---|---|---|---|---|---|---|
| HOURS | 618 | 1438 | 2073 | 2412 | 2743 | 3327 |
| MINEX 7 | 0.97 | 0.94 | 0.88 | 0.80 | 2.81 | 2.81 |
| MINEX 4 | 1.08 | 0.99 | 0.91 | 0.78 | 2.71 | 2.71 |
| IMSIL 1240 | 1.11 | 0.95 | 0.89 | 0.76 | 2.80 | 2.80 |
| IMSIL A-15 | 1.14 | 0.99 | 0.94 | 0.82 | 2.39 | 2.39 |
| HYDRITE FLAT D | 1.21 | 1.23 | 1.67 | 2.37 | 4.19 | 4.19 |
| GLOMAX LL | 0.59 | 2.39 | 3.24 | 4.38 | 6.14 | 6.14 |
| CL93-61A CALCINED COARSE | 1.01 | 1.04 | 1.23 | 1.45 | 2.37 | 2.37 |

TABLE 7

PART B

| PN3159B | COLOR CHANGE - QUV DELTA E | | | | |
|---|---|---|---|---|---|
| HOURS | 3640 | 3960 | 4277 | 4945 | 5351 |
| MINEX 7 | 2.63 | 2.62 | 2.51 | 2.88 | 2.78 |
| MINEX 4 | 2.62 | 2.56 | 2.47 | 2.83 | 2.72 |
| IMSIL 1240 | 2.58 | 2.57 | 2.48 | 2.91 | 2.62 |
| IMSIL A-15 | 2.33 | 2.24 | 2.15 | 2.69 | 2.69 |
| HYDRITE FLAT D | 5.32 | 6.84 | 8.03 | 10.48 | 13.10 |
| GLOMAX LL | 7.00 | 7.95 | 8.82 | 9.28 | 10.65 |
| CL93-61A CALCINED COARSE | 2.57 | 2.79 | 3.05 | 2.86 | 2.85 |

As seen in Table 7, architectural coating formulated as described with the present product (CL93-61A calcined) exhibit a low delta E over the exposure. The inventive formulation compares very favorably to the Minex and Imsil formulations, which formulations are generally considered to be very satisfactory.

Example 2

Architectural coating formulations based upon various pigments were prepared as set forth in the each of several tables below, following the procedure set forth in Example 3. Over a time period of exposure to weathering, relevant color and sheen data, e.g., delta E, delta L, absolute L, delta a, delta b, delta 85 degree, 85 degree values, were obtained for each formulation by the methods set forth in Example 1, except as noted below.

Details of the paint formulations used with the previous products and with the present inventive product (for comparison) are provided below.
Pigments
Hydrous Kaolin
 Hydrite Flat D (Dry Branch Kaolin Company (Dry Branch, Ga.)) is a hydrous kaolin clay described in Example 1 and serves as a positive control.
Calcined Kaolin
 GMT (Dry Branch Kaolin Company (Dry Branch, Ga.)) is a calcined, fine particle size kaolin. GLOMAX® LL is a calcined kaolin pigment having an intermediate particle size. Altowhite™ TE (Dry Branch Kaolin Company (Dry Branch, Ga.)) is a calcined kaolin of large intermediate particle size. Table 10 (below) sets forth further properties.
Calcined Kaolin, Large Particle
 EFP is a fully calcined, large particle kaolin of this invention, described in Example 1.
Formulae
 Formulations used to prepare architectural coatings used in Example 2 using hydrous pigments are set forth in Table 8, the formulations prepared following the procedure set forth in Example 3.

TABLE 8

LAB NO: P7621E PRODUCT: EXTERIOR PVA GALLONS: 100

| P.V.C. MATERIAL | P.V.C LBS/100 GAL. |
|---|---|
| WATER | 238.81 |
| KTPP | 1.78 |
| TAMOL 731 | 7.89 |
| IGEPAL CO-60 | 3.95 |

TABLE 8-continued

LAB NO: P7621E PRODUCT: EXTERIOR PVA GALLONS: 100

| P.V.C. MATERIAL | P.V.C LBS/100 GAL. |
|---|---|
| TRITON N-101 | 2.47 |
| COLLIDS 681F | 2.96 |
| TI102 (R-706) | 148.02 |
| HYDRITE FLAT D | 175.65 |
| NATROSOL 250 HR | 3.95 |
| GRIND TOTALS | 585.47 |
| UCAR 367 | 370.05 |
| ETHYLENE GLYCOL | 24.67 |
| TEXANOL | 9.87 |
| WATER | 94.73 |
| TOTAL PAINT | 1084.79 |
|  | 10000.00 |

Formulations used to prepare architectural coatings using calcined pigments are set forth in Table 9, the formulations prepared following the procedure set forth in Example 3.

TABLE 9

LAB NO: P7621A
PRODUCT: EXTERIOR PVA
GALLONS: 100

| MATERIAL | LBS |
|---|---|
| WATER | 238.81 |
| KTPP | 1.78 |
| TAMOL 731 | 7.89 |
| IGEPAL CO-610 | 3.95 |
| TRITON N-101 | 2.47 |
| COLLOIDS 681F | 2.96 |
| TI102 (R-706) | 148.02 |
| Calcined Kaolin: GMT GLOMAX LL ALTOWHITE TE EFP (Coarse Calcined) | 177.63 |
| NATROSOL 250 HR | 3.95 |
| GRIND TOTALS | 587.46 |
| UCAR 367 | 370.06 |
| ETHYLENE GLYCOL | 24.67 |
| TEXANOL | 9.87 |
| WATER | 94.74 |
| TOTAL PAINT | 1086.80 |
|  | 10000.00 |

PVC: 37.38% WT/GAL: 10.87
VEH SOL 18.73% VOC: 0.877
WT SOL 50.26% VOL SOLID: 35.38%

Table 10 sets forth properties of the architectural coatings prepared and used in the examples.

TABLE 10

PART A

PIGMENT PROPERTIES

| Product Type | ASTM-E 313 White | ASTM-E 313 Yellow | Brightness | L | a | b | ASTM-D 281 Rubout OIL ABS | ASTM-D 281 Rubout H₂O ABS |
|---|---|---|---|---|---|---|---|---|
| EFP (2) | 76.20 | 3.72 | 87.76 | 94.60 | −0.46 | 2.44 | 72.8 | |
| GMT (2) | 82.46 | 3.26 | 93.58 | 97.37 | −0.47 | 2.20 | 115.9 | 106 |
| Glomax LL | 76.46 | 4.57 | 90.98 | 96.97 | −0.42 | 3.07 | 67.0 | |
| Altowhite TE (2) | 79.98 | 3.78 | 92.92 | 97.06 | −0.83 | 2.55 | 88.3 | |
| Hydrite Flat D (1) | 50.12 | 9.47 | 74.95 | 89.80 | −0.11 | 5.93 | | |

TABLE 10

PART B

PIGMENT PROPERTIES

| PRODUCT TYPE | 5100 SEDIGRAPH % <5 | <2 | <1 | 0.5 | SURFACE AREA M2/G |
|---|---|---|---|---|---|
| EFP (2) | 71 | 24 | 8 | 2 | 5.1 |
| GMT (2) | 98 | 90 | 73 | 22 | |
| GLOMAX LL (2) | 89 | 64 | 40 | 7 | 9.7 |
| ALTOWHITE TE (2) | 92 | 58 | 26 | 3 | 9.1 |
| HYDRITE FLAT D (1) | 65 | 35 | 25 | 16 | 9.8 |

(1) Hydrous Kaolin
(2) Calcined Kaolin

Simulated Exposure

Table 11 sets forth absolute L values measured for the coatings as indicated.

TABLE 11

PART A

| | HOURS | | | | | | |
|---|---|---|---|---|---|---|---|
| | 0 | 143 | 191 | 310 | 475 | 641 | 808 |
| P7621Q1 | L | L | L | L | L | L | L |
| P7621A (Glomax LL) | 74.65 | 74.64 | 74.50 | 74.63 | 74.64 | 74.75 | 74.75 |
| P7621B (GMT) | 78.91 | 78.47 | 78.27 | 78.19 | 78.09 | 78.20 | 78.31 |
| P7621C (EFP) | 75.31 | 75.57 | 75.47 | 75.58 | 75.54 | 75.64 | 75.67 |
| P7621D (Altowhite TE) | 74.92 | 74.89 | 74.81 | 74.85 | 74.88 | 74.98 | 74.99 |
| P7621E (Hydrite Flat D) | 74.51 | 75.02 | 75.00 | 75.09 | 74.99 | 75.10 | 75.09 |

TABLE 11

PART B

| | HOURS | | | | | | | |
|---|---|---|---|---|---|---|---|---|
| | 1093 | 1309 | 1577 | 1912 | 2196 | 2413 | 2551 | 3053 |
| P7621Q1 | L | L | L | L | L | L | L | |
| P7621A (Glomax LL) | 74.71 | 74.78 | 74.86 | 74.88 | 74.99 | 75.02 | 75.11 | 75.04 |
| P7621B (GMT) | 78.44 | 78.74 | 79.01 | 79.43 | 79.93 | 80.21 | 80.67 | 81.06 |
| P7621C (EFP) | 75.69 | 75.86 | 75.91 | 75.86 | 75.90 | 75.65 | 75.92 | 75.75 |
| P7621D (Altowhite TE) | 74.97 | 75.12 | 75.48 | 75.50 | 75.81 | 75.89 | 76.06 | 76.15 |
| P7621E (Hydrite Flat D) | 74.99 | 75.05 | 75.03 | 74.91 | 74.93 | 74.85 | 74.94 | 74.64 |

Table 12 provides averages of delta L results obtained data for the architectural coatings as indicated. Three panels of each formulations were run for a total of 2551 hours, with measurements taken at the indicated time intervals.

TABLE 12

PART A

| | HOURS | | | | | | | |
|---|---|---|---|---|---|---|---|---|
| | 143 | 191 | 310 | 475 | 641 | 808 | 1093 | 1309 |
| P7621Q1 | Delta L | Delta L | Delta L | Delta L | Delta L | Delta L | Delta L | Delta L |
| P7621A (Glomax LL) | 0.01 | 0.15 | 0.03 | 0.01 | −0.10 | −0.10 | −0.06 | −0.13 |
| P7621B (GMT) | 0.43 | 0.64 | 0.72 | 0.82 | 0.71 | 0.60 | 0.47 | 0.17 |
| P7621C (EFP) | −0.26 | −0.16 | −0.27 | −0.23 | −0.34 | −0.37 | −0.38 | −0.55 |
| P7621D (Altowhite TE) | 0.03 | 0.11 | 0.07 | 0.04 | −0.06 | −0.08 | −0.05 | −0.21 |
| P7621E (Hydrite Flat D) | −0.50 | −0.48 | −0.58 | −0.48 | −0.59 | −0.57 | −0.47 | −0.53 |

TABLE 12

PART B

| | HOURS | | | | | | |
|---|---|---|---|---|---|---|---|
| | 1577 | 1912 | 2198 | 2413 | 2551 | 2850 | 3053 |
| P7621Q1 | Delta L | Delta L | Delta L | Delta L | Delta L | Delta L | Delta L |

TABLE 12-continued

PART B

| | HOURS | | | | | | |
|---|---|---|---|---|---|---|---|
| | 1577 | 1912 | 2198 | 2413 | 2551 | 2850 | 3053 |
| P7621A (Glomax LL) | −0.21 | −0.23 | −0.34 | −0.37 | −0.46 | | −0.39 |
| P7621B (GMT) | −0.11 | −0.52 | −1.03 | −1.31 | −1.76 | | −2.15 |
| P7621C (EFP) | −0.60 | −0.55 | −0.59 | −0.34 | −0.61 | | −0.44 |
| P7621D (Altowhite TE) | −0.57 | −0.59 | −0.89 | −0.97 | −1.14 | | −1.23 |
| P7621E (Hydrite Flat D) | −0.52 | −0.40 | −0.41 | −0.34 | −0.43 | | −0.13 |

Table 13 provides the averages of the delta E data from three panels coated with the architectural coatings indicated. Three panels of each formulation were run for a total of 2551 hours, with measurements taken at the indicated time intervals and averages calculated.

TABLE 13

PART A

| | HOURS | | | | | | |
|---|---|---|---|---|---|---|---|
| | 143 | 191 | 310 | 475 | 641 | 808 | 1093 |
| P7621Q1 | Delta E | Delta E | Delta E | Delta E | Delta E | Delta E | Delta E |
| P7621A (Glomax LL) | 0.24 | 0.28 | 0.21 | 0.24 | 0.40 | 0.33 | 0.28 |
| P7621B (GMT) | 0.50 | 0.65 | 0.75 | 0.86 | 0.78 | 0.96 | 1.32 |
| P7621C (EFP) | 0.33 | 0.26 | 0.29 | 0.26 | 0.48 | 0.43 | 0.44 |
| P7621D (Altowhite TE) | 0.27 | 0.26 | 0.20 | 0.25 | 0.40 | 0.28 | 0.28 |
| P7621E (Hydrite - Flat D) | 0.57 | 0.55 | 0.62 | 0.52 | 0.66 | 0.61 | 0.50 |

TABLE 13

PART B

| | HOURS | | | | | | |
|---|---|---|---|---|---|---|---|
| | 1309 | 1577 | 1912 | 2198 | 2413 | 2551 | 3053 |
| P7621Q1 | Delta E | Delta E | Delta E | Delta E | Delta E | Delta E | Delta E |
| P7621A (Glomax LL) | 0.46 | 0.43 | 0.54 | 0.77 | 0.99 | 1.09± | 1.35 |
| P7621B (GMT) | 1.77 | 2.39 | 3.50 | 4.27 | 4.80 | 5.52± | 6.15 |
| P7621C (EFP) | 0.65 | 0.65 | 0.73 | 0.81 | 0.68 | 0.80± | 0.71 |
| P7621 D (Altowhite TE) | 0.49 | 1.02 | 1.31 | 1.84 | 2.01 | 2.55± | 2.72 |
| P7621E (Hydrite - Flat D) | 0.62 | 0.53 | 0.43 | 0.47 | 0.38 | 0.52± | 2.72 |

Table 14 provides the averages of delta 85 degree results obtained data for the architectural coatings as indicated. Three panels of each formulation were run for a total of 2551 hours, with measurements taken at the indicated time intervals.

TABLE 14

PART A

| | | HOURS | | | | | |
|---|---|---|---|---|---|---|---|
| | 0 | 143 HRS | 191 HRS | 310 HRS | 475 HRS | 641 HRS | 808 HRS |
| P7621Q1 | 85 DEG | 85 DEG | 85 DEG | 85 DEG | 85 DEG | 85 DEG | 85 DEG |
| P7621A (Glomax LL) | 7.7 | 8.3 | 8.2 | 8.2 | 8.0 | 8.6 | 7.6 |
| P7621B (GMT) | 20.3 | 16.2 | 15.7 | 15.4 | 15.1 | 15.1 | 14.1 |
| P7621C (EFP) | 3.7 | 4.2 | 4.3 | 4.3 | 4.4 | 4.4 | 4.2 |
| P7621D (Altowhite TE) | 5.4 | 5.6 | 5.7 | 5.4 | 4.9 | 6.2 | 5.9 |
| P7621E (Hydrite Flat D) | 9.1 | 10.4 | 10.0 | 10.3 | 10.1 | 9.5 | 8.5 |

TABLE 14

PART B

| | HOURS | | | | | | |
|---|---|---|---|---|---|---|---|
| | 1093 HRS | 1309 HRS | 1577 HRS | 1912 HRS | 2198 HRS | 2551 HRS | 3053 HRS |
| P7621Q1 | 85 DEG | 85 DEG | 85 DEG | 85 DEG | 85 DEG | 85 DEG | 85 DEG |
| P7621A (Glomax LL) | 8.3 | 7.8 | 7.0 | 7.4 | 6.9 | 7.0 | 7.7 |
| P7621B (GMT) | 14.7 | 15.0 | 14.9 | 15.5 | 15.9 | 16.1 | 21.3 |
| P7621C (EFP) | 4.0 | 4.0 | 4.5 | 3.8 | 3.7 | 3.8 | 4.1 |
| P7621D (Altowhite TE) | 5.5 | 5.6 | 5.6 | 5.8 | 6.2 | 6.5 | 7.8 |
| P7621E (Hydrite Flat D) | 8.4 | 7.2 | 6.4 | 6.2 | 5.8 | 5.7 | 6.1 |

From these results it can be seen that the formulations of this invention have low sheen and therefore the pigments of this invention are good flatting agents.

Table 15 provides the averages of 85 degree data from the three panels for the architectural coatings as indicated.

TABLE 15

PART A

| | HOURS | | | | | |
|---|---|---|---|---|---|---|
| | 143 | 191 | 310 | 475 | 641 | 808 |
| P7621Q1 | Delta 85 DEG | Delta 85 DEG | Delta 85 DEG | Delta 85 DEG | Delta 85 DEG | Delta 85 DEG |
| P7621A (Glomax LL | −0.7 | −0.5 | −0.6 | −0.3 | −0.9 | 0.1 |
| P7621B (GMT) | 4.1 | 4.6 | 4.9 | 5.1 | 5.2 | 6.1 |
| P7621C (EFP) | −0.5 | −0.6 | −0.7 | −0.7 | −0.8 | −0.5 |
| P7621D (Altowhite TE) | −0.3 | −0.3 | −0.1 | 0.5 | −0.8 | −0.6 |
| P7621E (Hydrite Flat D) | −1.3 | −0.9 | −1.2 | −1.1 | −0.4 | 0.6 |

TABLE 15

| | PART B | | | | | | |
|---|---|---|---|---|---|---|---|
| | HOURS | | | | | | |
| P7621Q1 | 1093 Delta 85 DEG | 1309 Delta 85 DEG | 1577 Delta 85 DEG | 1912 Delta 85 DEG | 2198 Delta 85 DEG | 2551 Delta 85 DEG | 3053 Delta 85 DEG |
| P7621A (Glomax LL) | −0.7 | −0.1 | 0.7 | 0.3 | 0.8 | 0.7 | -0- |
| P7621B (GMT) | 5.6 | 5.3 | 5.4 | 4.8 | 4.4 | 4.2 | −1.1 |
| P7621C (EFP) | −0.4 | −0.3 | −0.8 | −0.1 | 0.0 | −0.2 | −0.7 |
| P7621 D (Altowhite TE) | −0.1 | −0.2 | −0.3 | −0.5 | −0.8 | −1.1 | −0.2 |
| P7621B (Hydrite Flat D) | 0.7 | 1.8 | 2.7 | 2.9 | 3.3 | 3.3 | 3.5 |

Example 3

General Procedures
Manufacturing Procedure for Exterior Latex
1. To a suitable tank, add the initial water.
2. Add the surfactants (i.e., TKPP, Tamol 731, Triton N-101, Igepal CO-610, Colloids 681F, and etc.).
3. Add the pigments (i.e., TiO$_2$, extenders, and etc.).
4. All of the above may be added while mixing.
5. Add the thickener (i.e., Natrosol 250HR) slowly while mixing at slow speed.
6. Mix 10 minutes or until the solution becomes thick.
7. Increase the speed of the high speed disperser. Grind until a 4NS (hagmen) grind is attained.
8. Slow the disperser and add the latex resin.
9. Add the ethylene glycol and Texanol slowly while mixing.
10. Add the final water while mixing.

Equipment Used to Make the Exterior Latex
1. High speed disperser with an F-style disperser blade.
2. The lab samples were made in a 1000 ml stainless steel beaker.
3. A drill press with a top speed of 3500 rpms and a 3 inch blade were used.

Throughout this application, various publications are referenced. The disclosures of these publications in their entireties are hereby incorporated by reference into this application in order to more fully describe the state of the art to which this invention pertains.

Although the present process has been described with reference to specific details of certain embodiments thereof, it is not intended that such details should be regarded as limitations upon the scope of the invention except as and to the extent that they are included in the accompanying claims.

What is claimed is:

1. A composition comprising the pigment produced by a process comprising calcining a feed comprising kaolin having a median equivalent spherical diameter (e.s.d.) as measured on a Sedigraph 5100 of greater than about 2.0 microns, and wherein up to 15% of the kaolin has a median e.s.d. of less than 0.5 microns, thus producing the pigment.

2. The composition of claim 1, wherein the feed is fully calcined.

3. The composition of claim 1, wherein the feed is partially calcined.

4. The composition of claim 1, wherein the feed further comprises a weathering-inert diluent.

5. The composition of claim 1, wherein the composition further comprises a weathering-inert diluent.

6. The composition of claim 1, wherein the feed further comprises one or more UV inert material selected from the group consisting of crystalline silica, amorphous silica, synthetic silicas and silicates.

7. The composition of claim 1, wherein the feed comprises an at least partially delaminated kaolin.

8. The composition of claim 1, wherein the feed comprises at least 67% kaolin.

9. The composition of claim 1, wherein the kaolin contains low levels of titania-containing impurities.

10. The composition of claim 1, wherein the kaolin has a high aspect ratio.

11. The composition of claim 1, wherein the kaolin has a median e.s.d. greater than about 2.5 microns.

12. The composition of claim 1, wherein the kaolin has a median e.s.d. greater than about 3.0 microns.

13. The composition of claim 1, wherein the kaolin has a median e.s.d. greater than about 3.5 microns.

14. The composition of claim 1, wherein up to 10% of the kaolin has a median e.s.d. of less than 0.5 microns.

15. The composition of claim 1, wherein up to 5% of the kaolin has a median e.s.d. of less than 0.5 microns.

16. The composition of claim 1, wherein up to 2% of the kaolin has a median e.s.d. of less than 0.5 microns.

17. A weathering-resistant industrial coating or architectural coating composition comprising the composition of claim 1.

18. A composition comprising a pigment comprising calcined kaolin having a median equivalent spherical diameter (e.s.d.) as measured on a Sedigraph 5100 of greater than about 2.0 microns, and wherein up to 15% of the kaolin has a median e.s.d. of less than 0.5 microns.

19. The composition of claim 18, wherein the kaolin is fully calcined.

20. The composition of claim 18, wherein the kaolin is partially calcined.

21. The composition of claim 18, wherein the composition further comprises a weathering-inert diluent.

22. The composition of claim 18, wherein the composition further comprises one or more UV inert material selected from the group consisting of crystalline silica, amorphous silica, synthetic silicas and silicates.

23. The composition of claim 18, wherein the pigment comprises an at least partially delaminated kaolin.

24. The composition of claim 18, wherein the pigment comprises at least 67% kaolin.

25. The composition of claim 18, wherein the kaolin contains low levels of titania-containing impurities.

26. The composition of claim 18, wherein the kaolin has a high aspect ratio.

27. The composition of claim 18, wherein the kaolin has a median e.s.d. greater than about 2.5 microns.

28. The composition of claim 18, wherein the kaolin has a median e.s.d. greater than about 3.0 microns.

29. The composition of claim 18, wherein the kaolin has a median e.s.d. greater than about 3.5 microns.

30. The composition of claim 18, wherein up to 10% of the kaolin has a median e.s.d. of less than 0.5 microns.

31. The composition of claim 18, wherein up to 5% of the kaolin has a median e.s.d. of less than 0.5 microns.

32. The composition of claim 18, wherein up to 2% of the kaolin has a median e.s.d. of less than 0.5 microns.

33. A weathering-resistant industrial coating or architectural coating composition comprising the composition of claim 18.

34. A method of producing a pigment comprising fully calcining a feed comprising a kaolin having a median equivalent spherical diameter (e.s.d.) as measured on a Sedigraph 5100 of greater than about 2.0 microns, and wherein up to 15% of the kaolin has an e.s.d. of less than 0.5 microns, thus producing the pigment.

35. The method of claim 34, wherein the feed further comprises a weathering-inert diluent.

36. The method of claim 34, wherein the feed further comprises one or more weathering-inert material selected from the group consisting of crystalline silica, amorphous silica, synthetic silicas and silicates.

37. The method of claim 34, wherein the feed comprises an at least partially delaminated kaolin.

38. The method of claim 34, wherein the feed comprises at least 67% kaolin.

39. The method of claim 34, wherein the kaolin contains low levels of titania-containing impurities.

40. The method of claim 34, wherein the kaolin has a high aspect ratio.

41. The method of claim 34, wherein the kaolin has a median e.s.d. greater than about 2.5 microns.

42. The method of claim 34, wherein the kaolin has a median e.s.d. greater than about 3.0 microns.

43. The method of claim 34, wherein the kaolin has a median e.s.d. greater than about 3.5 microns.

44. A method of producing a pigment comprising partially calcining a feed comprising a kaolin having a median equivalent spherical diameter (e.s.d.) as measured on a Sedigraph 5100 of greater than about 2.0 microns, and wherein up to 15% of the kaolin has a median e.s.d. of less than 0.5 microns, thus producing the pigment.

45. A method of producing a pigment comprising
   (a) delaminating a crude kaolin clay which is capable of being fractionated to form two or more fractions, one fraction comprising a large particle size fraction, which large particle size fraction cannot be further effectively reduced in particle size by further delamination;
   (b) drying the large particle size fraction obtained from (a) to form a dried feed;
   (c) calcining the dried feed obtained from (b) to yield a calcination product comprising the produced pigment.

46. The method of claim 45, wherein a weathering-inert diluent is added to the dried feed calcined.

47. The method of claim 45, further comprising adding a weathering-inert diluent to the calcination product to produce the pigment.

48. The pigment produced by the method of claim 45.

49. A method of producing a pigment comprising
   (a) delaminating a crude kaolin fraction which delaminated crude fraction is capable of being fractionated to form two or more size fractions, one size fraction comprising a large particle size fraction, which large particle size fraction cannot be further effectively reduced in particle size by further delamination;
   (b) drying the large particle size fraction obtained from (a) to form a dried feed;
   (c) calcining the dried feed obtained from (b) to yield a calcination product comprising the produced pigment.

50. The method of claim 49, wherein a weathering-inert diluent is added to the dried feed.

51. The method of claim 49, further comprising adding a weathering-inert diluent to the calcination product to produce the pigment.

52. The pigment produced by the method of claim 49.

53. The composition of claim 6, wherein the UV inert material is silicate selected from one or more of aluminosilicates, alumina, mica, wollastonite or nepheline syenite.

54. The composition of claim 22, wherein the UV inert material is silicate selected from one or more of aluminosilicates, alumina, mica, wollastonite or nepheline syenite.

55. The composition of claim 36, wherein the UV inert material is silicate selected from one or more of aluminosilicates, alumina, mica, wollastonite or nepheline syenite.

* * * * *